Patented May 14, 1940

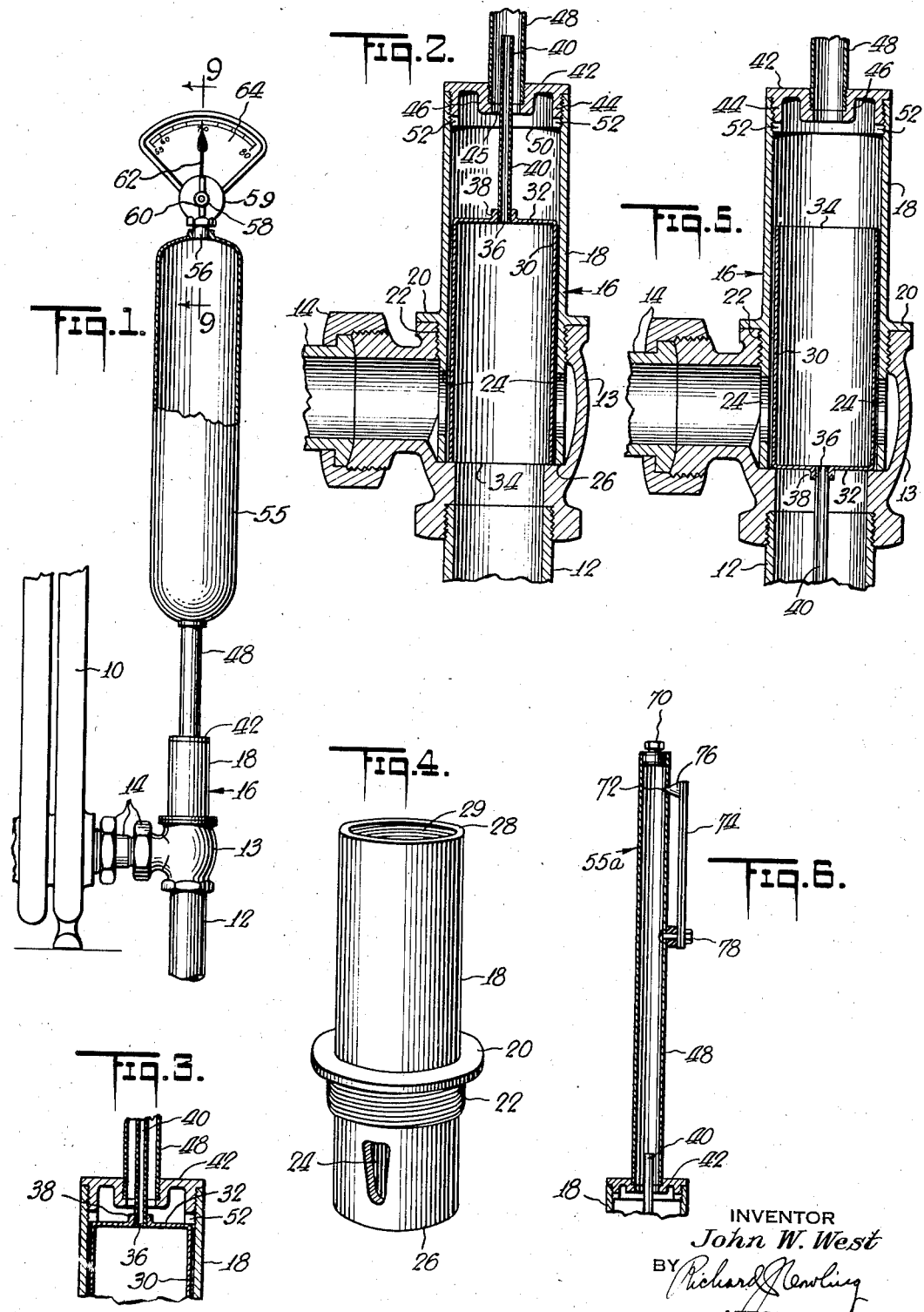

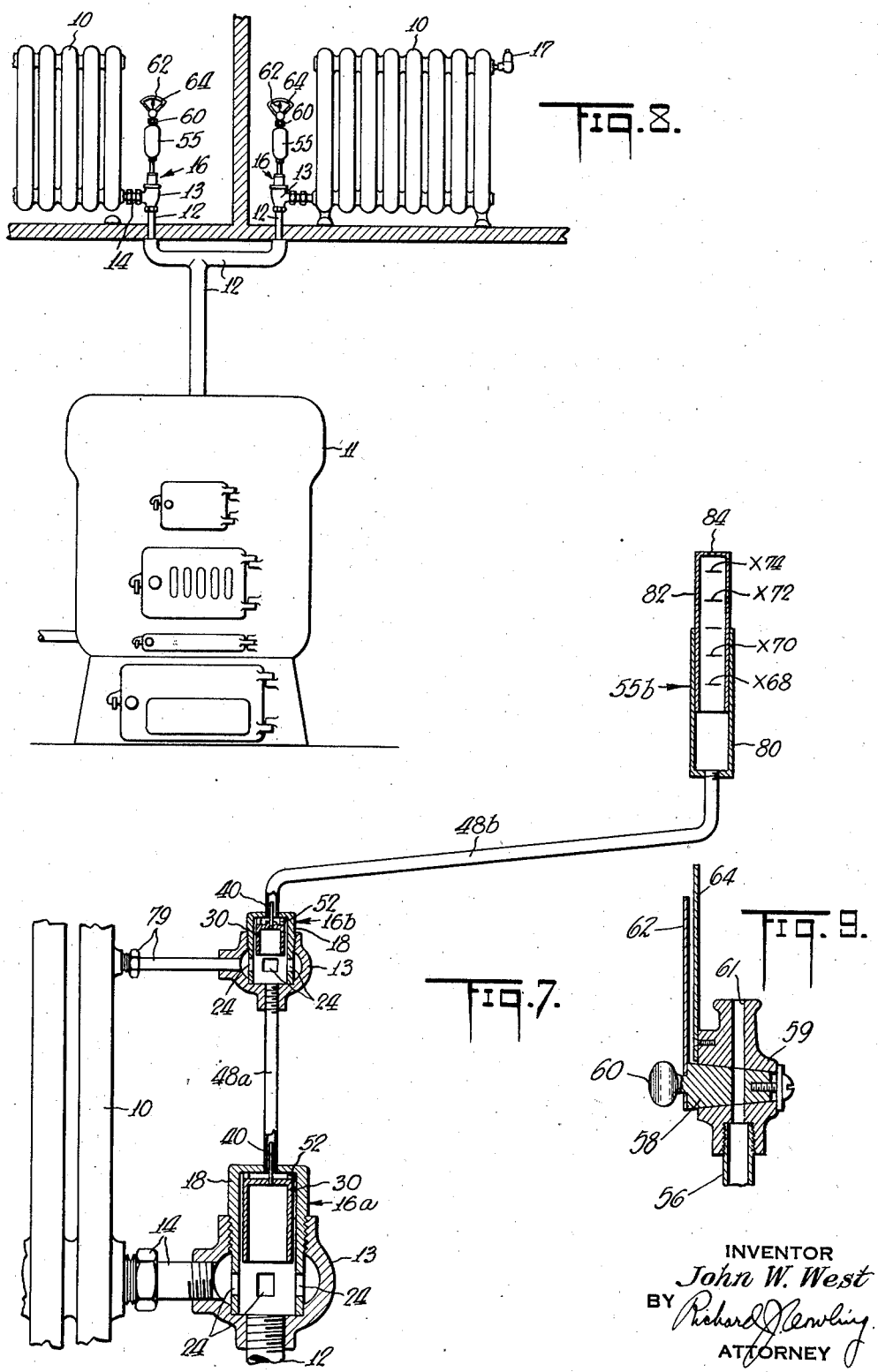

2,200,729

UNITED STATES PATENT OFFICE 2,200,729

RADIATOR CONTROL FOR STEAM HEATING SYSTEMS

John W. West, Maplewood, N. J.

Application November 5, 1937, Serial No. 172,931

24 Claims. (Cl. 236—37)

The present invention relates to improvements in a multiple steam heating system of the general type in which the individual radiators thereof are supplied with steam from a common source at greater than atmospheric pressure, and it has particular relation to an individual automatic or semi-automatic temperature control mechanism for each of such radiators.

An object of the present invention is to provide a simple and inexpensive automatic temperature control mechanism for the individual radiators of a multiple steam heating system, which is operated by fluctuations in the temperature of the room in which said mechanism is located, for regulating the supply of steam to its directly connected radiator of a multiple steam radiator heating system.

Another object of the invention is the provision of a simple and inexpensive semi-automatic temperature control mechanism for the individual radiators of a multiple steam heating system, which is operated by fluctuations in the temperature of the room in which said mechanism is located, for regulating the supply of steam to its directly connected radiator of a multiple steam radiator heating system.

A further object of the invention is to provide a simple and inexpensive temperature control mechanism for the individual radiators of a multiple steam radiator heating system which will permit variations and maintenance of different temperatures in the individual radiators thereof independently of the steam pressure in said system.

Another object of the invention is to provide a simple and inexpensive temperature control mechanism for the individual radiators of a multiple steam heating system which is easily and quickly installed in conventional steam heating systems, and which is substantially free of moving parts, delicate control mechanisms requiring outside sources of operating power, etc.

A further object of the invention is the provision of automatic temperature controls for the individual radiators of a multiple steam radiator heating system, which are applicable to conventional types of multiple steam radiator heating systems without material change or alteration.

Another object of the invention is to provide an automatic or semi-automatic temperature control for the individual radiators of a multiple steam radiator heating system, which is exceedingly simple to regulate, viz: change or otherwise vary the temperature settings without requiring the use of tools or the services of a mechanic or other skilled technician.

A further object of the invention is the provision of a simple and inexpensive piston type sleeve valve which is capable of being fitted to the casing of a conventional globe type control valve on installed steam radiator heating systems quickly and efficiently without requiring material changes or alterations in said systems.

Other and further objects and advantages of the invention will be apparent from the following description, wherein several forms of the invention are described and shown in detail, reference being had to the accompanying drawings forming a part thereof, wherein like numerals indicate like parts, in which:

Fig. 1 is a fragmentary front elevational view of one form of apparatus which the invention may assume;

Fig. 2 is an enlarged fragmentary cross-sectional view of the heat control unit shown in Fig. 1 of the drawings;

Fig. 3 is a fragmentary sectional view of the upper part of the apparatus shown in Fig. 2, illustrating the relative position of its various parts when the piston is in its extreme upper position;

Fig. 4 is an enlarged perspective view of the sleeve member or casing, shown in Fig. 2;

Fig. 5 is a longitudinal sectional view similar to Fig. 2, but showing the piston mounted in the sleeve member or casing in an inverted position;

Fig. 6 is a longitudinal sectional view, partially in elevation, of a condenser, the same being provided with a conventional bi-metallic temperature control for thermostatically opening and/or closing the atmospheric discharge vent;

Fig. 7 is another form of the invention, wherein the individual radiators are provided with a plurality of automatic heat control units constructed in accordance with the invention, and a telescopic condenser which permits variations in its size, thereby resulting in changes in the temperature control for its respective radiator unit;

Fig. 8 is a diagrammatic view of a multiple steam heating system, having the individual radiators thereof provided with heat control units constructed in accordance with the present invention; and Fig. 9 is an enlarged vertical sectional view of the control valve on the atmospheric discharge vent of the condenser chamber, the same being taken along the line 9—9 of Fig. 1.

With reference to the drawings, and particularly Fig. 8, there is shown a multiple steam radiator heating system in which the individual steam radiators 10 are supplied with steam from a conventional steam heating boiler 11 through a single line steam pipe system 12, control valves 13 and conventional inlet pipe connections 14.

Referring now to Fig. 4 of the drawings, the valve control mechanism 16 of the present invention consists of a cylindrical outer sleeve member or casing 18, having intermediate its ends a laterally projecting and circumferentially extending flange 20, and an externally threaded shoulder portion 22 immediately below and adjacent the underside of said flange member 20. The sleeve member or casing 18 is also provided with a pair of diametrically opposite inlet ports or apertures 24, extending entirely through the sides thereof between the threaded shoulder portion 22 and the lower edge 26 thereof. The upper end 28 of the sleeve member or casing 18 is also threaded internally, as indicated at 29, to receive a threaded cap member hereinafter to be described.

As best shown in Fig. 2, a hollow cylindrical piston member 30, having a closed upper end or head 32 and an open bottom end 34, is slidably mounted within the sleeve or casing member 18. The closed upper end 32 of the piston 30 is provided with an axial aperture or opening 36, having outwardly projecting flanged shoulder 38 extending circumferentially thereof. The shoulder 38 is internally threaded for receiving a correspondingly threaded end of a relatively small diameter projecting tube 40 to be mounted therein, said projecting tube 40 is of a length sufficient to extend a substantial distance beyond the sleeve 18 and cap member 42 at all positions of the piston 30 therein.

The cap member 42 is provided for closing the open top of the sleeve or casing 18, and has a downwardly projecting circumferentially extending outer flange 44, which is externally threaded for mounting on the internal threads 29 of the upper end 28 of the sleeve member or casing 18. The cap member 42 is also provided with a central aperture 45, having a downwardly extending axially projecting inner flange 46, which is threaded to receive a correspondingly threaded end of a connecting condenser pipe 48. Radial grooves 52 are provided in the bottom of the outer flange 44 of the cap member 42 for facilitating the passage or drainage of the condensation water in that portion of the system thereabove, the water passing through the grooves 52 over the top of the piston 30 and downwardly between the sidewalls thereof and the sleeve 18 into the valve casing 13, and then back into the pipe 12 and into the boiler 11.

Referring now to Fig. 1 of the drawings, a condenser 55 is shown connected to the opposite end of the connecting condenser pipe 48, which condenser 55 is in the form of a hollow cylindrical tank of substantial surface area in proportion to the supply of steam thereto. The condenser 55 has a relatively small atmospheric discharge opening or vent 56 at the opposite end thereof from its inlet pipe 48. The opening or vent 56 is provided with a valve member 58 of any suitable construction, which is adapted to entirely close the opening or to vary its size, whichever is desired. The valve 58, which is shown in detail in Fig. 9, is mounted within a valve casing 59, and is provided with an atmospheric discharge opening 61. The valve 58 is directly connected with a handle member 60, which in turn is directly connected to a pointer or indicator 62. A graduated scale or temperature indicia 64 is mounted directly behind the pointer 62 for indicating the particular setting of the valve 58 for obtaining a certain room temperature. In other words, the size of the discharge opening or vent 56 in the condenser 55 determines the temperature that is available with the valve operating mechanism 16, and the pointer 62 and scale 64 merely transposes the size of the discharge opening or vent 56 into direct temperature readings for the convenience of the operator.

In assembling the various parts of the apparatus shown in Figs. 2, 3 and 4, the regular valve operating mechanism (not shown) of a conventional globe valve is removed from its valve casing 13 in a conventional steam heating system, and the sleeve or casing member 18 is threaded thereinto by means of its threaded shoulder 22. The piston member 30 is positioned within the sleeve 18, with its projecting tube 40 extending upwardly and through the axial opening 44 of the cap member 42, which is in turn threaded into the top 28 of the sleeve 18 on the threads 29 thereof. The connecting pipe 48 is then threaded into the top of the cap member 30, thereby connecting the condenser 55 into the valve mechanism 16.

In describing the actual operation of the apparatus shown in Figs. 1, 2, 3 and 4, it is to be assumed that the radiator and room are cold; that there is maintained a constant steam pressure in the boiler 11 and pipes 12; and that the discharge vent 56 on the condenser 55 is now turned until a partial opening is effected therein. The steam pressure in the boiler 11 will cause steam to rise into the valve mechanism 16, forcing the piston 30 to the top of the sleeve 18 and at the same time forcing a small portion of the steam up through the projecting tube 40 into the connecting pipe 48 and condenser 55, thereby at first forcing the air therein out through the open vent 56. As soon as the piston is forced upwardly in the sleeve 18, the radiator inlet ports 24 are uncovered or opened and the steam pressure in the system likewise forces a major portion of the steam entering the valve casing 13 from the pipe 12 into the radiator 10, and at the same time the entrapped air within said radiator 10 is forced out through its conventional air vent valve 17, as best shown in Fig. 8. The steam entering into the radiator 10 manifestly will heat up the same, closing the conventional air vent 17 and increasing the temperature of the room in which said radiator is situated by the radiation of the heat from said radiator 10 into the surrounding atmosphere.

Obviously, when all of the entrapped air is forced out of the condenser 55 through its discharge vent 56, the steam entering into and filling the condenser will likewise begin to discharge into the atmosphere in the room. However, a major portion of the steam entering into the condenser 55, until the latter is heated to the temperature required to prevent condensation thereof, will be condensed by the coolness of the sidewalls of the condenser 55, which in turn are directly affected by the coolness of the temperature of the surrounding air in said room. As the temperature in the room rises due to the radiation of heat from the radiator, less and less steam will be condensed in the condenser 55, and by reason of the relatively small size of the discharge opening 56 in the condenser as compared to the inlet connecting pipe 48, a pressure is gradually being built up in the condenser 55 until it is nearly equal to the pressure in the steam line pipe 12. When this pressure in the condenser 55 is built up to a point equal to the existing pressure in the steam line 12, it is apparent that the piston 30 will by reason of its own weight and the action of gravity thereon fall to the bottom of the sleeve or casing 18, thereby closing off the inlet ports 24 through which steam must be passed to the radiator 10. It is an obvious fact that as the temperature of the room again cools down, because of the shutting off of the steam supply to the radiator 10, more and more condensation of steam will take place in the condenser 55, thereby causing a lowering of the built up pressure therein. When this built up pressure in the condenser 55 is reduced to a point sufficiently below the pressure existing in the steam pipe 12, the difference in pressure below and above the piston 30 will again be sufficient to raise the piston 30, thereby again opening the ports 24 and allowing steam to again pass into the radiators 10. This same cycle of operation will continue indefinitely and as long as there is steam pressure in the supply line 12 for a given setting of the discharge vent or opening 56. However, by increasing or decreasing the size of the discharge vent or opening 56 in the condenser 55, it is possible to control and/or regulate the time required to build up a pressure above the piston 30, and in this manner the time in which steam is permitted to flow from the boiler 11 directly into the steam radiator 10 through the pipes 12 is controlled, resulting in a controlled room temperature. Therefore, the temperature markings on the indicator 62 must be predetermined for the temperatures desired, and graduated in accordance with such predetermined markings into indicia which will convey to the operator the temperature obtainable with the settings of the valve 58 controlling the size of the opening of the discharge vent 56.

The water resulting from the condensation of the steam in the condenser 55 will tend to flow down the sides thereof and back into the connecting pipe 48 and into the valve unit 16. Upon reaching the sleeve 18, this water will flow across the top of the piston 30, when the latter is in its uppermost position, through the radial grooves 52 in the flange 44 of the cap member 42 and down between the sides of the piston 30 and sleeve 18 into the valve casing 13, thereby joining the condensation water returning from the radiator 10, and flowing back into the boiler 11 through the pipe 12 in a manner which is well understood in the art of a single line steam heating system.

Referring now to Fig. 5 of the drawings, there is shown another form in which the invention is operable. In this modification, the apparatus is substantially identical to that shown in Fig. 2, except that the piston 30 is mounted within the outer sleeve or casing 18 in an inverted position, with its projecting tube 40 extending downwardly into the valve casing 13 and into the steam inlet pipe 12 instead of upwardly into the connecting condenser pipe 48. In this arrangement the drainage of the condensation in the system above the piston 30 is into the cupped portion of the piston 30 and downwardly through the projecting tube 40 instead of between the sides of the piston 30 and the sidewall of the sleeve or casing 18. In all other respects, the operation of the mechanism is identical to that heretofore described and need not be repeated here.

Referring to Fig. 6 of the drawings, there is shown another form of the invention, wherein the condenser 55—a is fashioned from the connecting pipe 48 by plugging the outer end thereof with a conventional pipe plug 70, and providing a discharge vent or opening 72 in the side thereof adjacent said plugged end. The discharge vent 72, in this arrangement, is provided with a conventional bi-metallic thermostatic bar 74, such as are commonly employed in thermostatic apparatus, for thermostatically opening and/or closing the same. It is well understood that such bars 74, by reason of the different co-efficients of expansion of the two metals or substances employed, bend or flex one way under a rise of temperature, and in the reverse direction on the fall of temperature. One end of the bar 74 is secured to the pipe 48, as indicated at 78, and the other or free end is provided with a suitable needle-like valve 76. After initial setting or adjustment, the thermostatic bar 74 will open the discharge vent 72 at one given temperature and will close the same at another given temperature. In this arrangement, a relatively small condenser 55—a is required, which may consist merely of the connecting pipe 48, since the bi-metallic thermostatic bar 74 will open and close the discharge vent 72 quickly and efficiently at the desired temperatures for which it is adjusted. When the vent 72 is closed pressure will be built up in the pipe 48 or condenser 55—a until it is equal to or greater than the pressure below the piston 30, and the latter will drop by reason of its own weight and gravity closing the ports 24 and shutting off the steam supply to the radiator 10. However, when the room temperature cools down sufficiently to cause the thermostatic bar 74 to open the discharge vent 72, the pressure above the piston 30 will be reduced sufficiently below the pressure in the steam line 12, and the latter will force the piston 30 to the top of the cylindrical sleeve 18 thereby uncovering the ports 24 and permitting a supply of steam to flow again into the radiator 10 from the pipes 12 until such time as the temperature of the room again affects the thermostatic bar 74 in such a manner as to cause the needle-like valve 76 to again close the discharge vent 72 and permit the pressure to build up in the condensing chamber 55—a until it is equal to the pressure in the steam pipes 12, thereby allowing the piston 30 to drop and close said ports 24 to the radiator 10.

Referring now to Fig. 7 of the drawings, there is shown another form which the invention may assume, in which two automatic valve control units 16 are shown connected in series with each other and the supply line 12 and in parallel with the radiator 10, the lower or main valve unit 16—a being connected directly to the bottom of the radiator 10 in the same manner as its corresponding valve unit 16 in the previously described installations. However, the upper or intermediate control valve unit 16—b, which is substantially identical in construction to the unit 16 of the previous forms, is directly connected to the top of the same radiator 10, as indicated at 79, and this second control valve unit receives its supply of steam from the connecting pipe 48—a leading from the main valve unit 16—a. The connecting condenser pipe 48—b, leading from the top of the second or intermediate unit 16—b, is connected to a condenser 55—b, which is shown in a slightly modified form as being of a telescopic construction. This telescopic condenser member 55—b consists of a stationary member 80 and a slidable or adjustable member 82 mounted in the open end of said stationary member 80. The extreme outer end of the member 82 is closed except for a small discharge vent 84, which is open to the atmosphere. The size of the condenser member 55—b may be varied by merely moving the tubular slidably adjustable member 82 into and out of the stationary member 80. The temperature markings indicated on the outside of the tubular member 82 indicate the exact positions of the slidable member 82 with respect to the end of the stationary member 80 for obtaining the room temperatures indicated thereon. In this construction, it will be apparent that the valve unit 16—b will remain open whenever the temperature in the room is low enough to keep the pressure in the condensing chamber 55—b sufficiently lower than the pressure in the main supply line 12; and that the main valve unit 16—a will remain open whenever the pressure in the radiator 10 is sufficiently lower than the pressure in the main supply line 12, and will close only when the pressure in the radiator 10 is nearly equal to the pressure in the main supply line 12. The valve unit 16—a will open again whenever the radiator 10 has cooled sufficiently to reduce the pressure therein below the pressure in the main supply line 12. Obviously, the operation of the valves 16—a and 16—b are identical with the operation of the valve 16, except, however, for their opening and closing operations which are hereinabove described. The valve 16—b may be much smaller than the valve 16—a, thereby permitting only a very small amount of steam to escape into the condenser line 48—b, the balance of the steam necessary for opening the valve 16—a passing directly to the radiator 10 through the line 79 when the valve 16—a is open. It is apparent that the double valve installation is capable of operating with a much smaller condenser, and for that reason may be found preferable in many instances.

The drawings illustrate the invention only in connection with a single line steam heating system, but it is to be understood that it is also adaptable for use with a double line steam heating system. In fact experience has shown that the invention has slightly greater efficiency with a double or return line steam heating system than with a single line steam heating system.

While I have shown and described several forms of condensers 55, 55—a and 55—b in connection with the several forms of installations shown in the drawings, it is to be understood that these forms are shown and described for the purpose of illustration only and are not limited to the particular installation with which they have been depicted and described, but are interchangeable.

Although I have only described in detail several modifications which the invention may assume, it will be apparent to those skilled in the art that the invention is not so limited, but that various other modifications may be made therein without departing from the spirit thereof or from the scope of the appended claims.

What I claim is:

1. In combination with a steam heating system, a steam radiator, a steam supply line, a steam condensing chamber having an atmospheric discharge vent, and a steam pressure operable inlet valve having ports for connecting said steam supply line to said radiator and said condensing chamber.

2. In combination with a steam heating system, a steam radiator, a steam supply line, a steam condensing chamber having an atmospheric discharge vent, means for opening and closing said discharge vent, and a steam pressure operable inlet valve having ports for connecting said steam supply line to said radiator and to said condensing chamber.

3. In combination with a steam heating system, a steam radiator, a steam supply line, a steam condensing chamber having an atmospheric discharge vent, thermostatically operable means for opening and closing said discharge vent, and a steam pressure operable inlet valve having ports for connecting said steam supply line to said radiator and to said condensing chamber.

4. In combination with a steam heating system, a steam radiator, a steam supply line, a steam condensing chamber having an atmospheric discharge vent, means for manually varying the size of said discharge vent, and a steam pressure operable inlet valve having ports for connecting said steam supply line to said radiator and to said condensing chamber.

5. In combination with a steam heating system, a steam radiator, a steam supply line, an adjustable steam condensing chamber having an atmospheric discharge vent, and a steam pressure operable inlet valve having ports for connecting said steam supply line to said radiator and to said condensing chamber.

6. In combination with a steam heating system, a steam radiator, a steam supply line, a steam condensing chamber of substantial surface area having an atmospheric discharge vent, and a steam pressure operable inlet valve having a port directly open to said condensing chamber and ports for connecting said steam supply line to said radiator when the steam pressure in said condensing chamber is below the steam pressure of said supply line.

7. In combination with a steam heating system, a steam radiator, a steam supply line, a steam condensing chamber of substantial surface area having an atmospheric discharge vent, and a steam pressure operable inlet valve of a sleeve type construction having ports adjacent its steam receiving end for admitting steam to said radiator when the steam pressure in said line is greater than the pressure in said condensing chamber and a port beyond said radiator ports and adjacent its opposite end which is always in open communication with said condensing chamber.

8. In combination with a steam heating system, a steam radiator, a steam supply line, a steam condensing chamber, a steam pressure operable inlet valve having ports for connecting said steam supply line to the base of said radiator and also having a port extending therethrough and connecting said steam supply line to a second steam pressure operable inlet valve, said second steam pressure valve having ports for connecting the steam supply line to the top of said radiator and also having a port extending therethrough and connecting said steam supply line to said condensing chamber.

9. In combination with a steam heating system, a steam radiator, a steam supply line, a steam condensing chamber having an atmospheric discharge vent, means for thermostatically opening and closing said discharge vent, a steam pressure operable inlet valve having ports for connecting said steam supply line to the base of said radiator and also having a port extending therethrough and connecting a second steam pressure operable inlet valve, said second steam pressure valve having ports for connecting said steam supply line to the top of said radiator and also having a port extending therethrough and connecting said steam supply line to said condensing chamber.

10. In combination with a steam heating system, a steam radiator, a steam supply line, a steam condensing chamber, and a pair of steam pressure operable inlet valves connected in parallel to said steam radiator and in series with said condensing chamber, said first inlet valve having ports for connecting the steam supply line to the base of said radiator when the steam pressure in said supply line is greater than the pressure above said valve, said first valve having a port above said radiator ports which is always in communication with said second inlet valve, and said second inlet valve having ports connecting its steam supply line from said first valve to the top of said radiator when the pressure in its supply line is greater than the pressure in said condensing chamber, said second valve having a port above its radiator ports which is always in communication with said condensing chamber.

11. In combination with a steam heating system, a pressure operable regulating valve which comprises a tubular sleeve having its lower edge adapted to be mounted within the casing of a conventional globe valve connecting a steam radiator to a steam supply line, said tubular sleeve having ports adjacent its lower edge opening into said radiator, a cap for closing the upper open end of said sleeve, said cap having an axial opening therethrough for receiving a discharge line, and a piston slidably mounted in said tubular sleeve having a discharge tube axially mounted through said closed end and projecting into said discharge line at all positions of said piston.

12. In combination with a steam heating system, a steam radiator, a steam supply line, a steam condensing chamber having an atmospheric discharge vent, and a piston type steam pressure operable regulating valve connecting said steam supply line to said radiator, said piston having an opening therethrough for allowing passage of a small portion of the steam from said supply line to said condensing chamber at all positions of said piston valve.

13. In combination with a steam heating system, a steam radiator, a steam supply line, a steam condensing chamber having an atmospheric discharge vent, and a piston type steam pressure operable regulating valve connecting said steam supply line to said radiator, said piston operating to open the ports to said radiator by the pressure in said supply line and to close said ports by gravitational force induced by its own weight when the pressure in the condensing chamber becomes sufficiently great to equalize the pressure in the supply line.

14. In combination with a steam heating system, a steam radiator, a steam supply line, a steam condensing chamber having an atmospheric discharge vent, and a steam pressure operable control valve connecting said steam supply line to said radiator, said valve having a port open at all positions to said steam condensing chamber for passing a portion of the steam in said supply line to said condensing chamber whenever there is pressure in said supply line.

15. In combination with a steam heating system, a steam radiator, a steam supply line, a steam condensing chamber having an atmospheric discharge vent provided with means for varying its size, and a steam pressure operable control valve connecting said steam supply line to said radiator, said valve having a port open at all positions to said steam condensing chamber for passing a portion of the steam in said steam supply line to said condensing chamber whenever there is pressure in said supply line.

16. In combination with a steam heating system, a piston type steam pressure operable regulating valve for connecting a steam radiator to a steam supply line, said valve comprising a tubular sleeve having its lower edge adapted to be mounted within the casing of a conventional globe valve and its opposite end closed, a discharge line leading from its closed end for connecting said valve to a condensing chamber, a piston slidably mounted within said sleeve having an opening extending therethrough for passing steam from said supply line at all times to said discharge line, and a condensing chamber mounted on the opposite end of said discharge line having an atmospheric vent for permitting the escape of steam therefrom.

17. In combination with a steam heating system, a steam radiator, a steam supply line, a steam condensing chamber having an atmospheric discharge vent provided with thermostatically operable means for opening and closing the same, and a steam pressure operable control valve connecting said steam supply line to said radiator, said valve having a port open at all positions to said steam condensing chamber for passing a portion of the steam in said steam supply line to said condensing chamber whenever there is pressure in said supply line.

18. In combination with a steam heating system, a steam radiator, a steam supply line, a steam condensing chamber having an atmospheric discharge vent provided with thermostatically operable means for opening and closing the same, and a piston type steam pressure operable control valve connecting said steam supply line to said radiator, said valve having a port open at all positions of said piston for passing steam to said condensing chamber whenever there is pressure in said supply line.

19. In combination with a steam heating system, a steam radiator, a steam supply line, a steam condensing chamber having an atmospheric discharge vent, a main steam pressure operable inlet valve connecting said steam supply line to the base of said radiator and having an opening therethrough connecting said steam supply line to a steam pressure operable control valve, said control valve having ports connecting the steam line from the main valve to the top of said radiator and having an opening therethrough connecting the steam line from the main valve to said condensing chamber.

20. In combination with a steam heating system, a steam radiator, a steam supply line, a steam condensing chamber having an atmospheric discharge vent, a piston type main steam pressure operable inlet valve connecting said steam supply line to the base of said radiator and having a passage extending therethrough for connecting said steam supply line to a piston type steam pressure operable control valve, said control valve having ports connecting the steam line from the main valve to the top of said radiator and also having a passage extending therethrough for connecting the steam line from the main valve to said condensing chamber.

21. In combination with a steam heating system, a steam radiator, a steam supply line, a steam condensing chamber having an atmospheric discharge vent, a piston type main steam pressure operable inlet valve connecting said steam supply line to the base of said radiator and having a passage extending through the piston head for connecting said steam supply line to a piston type steam pressure operable control valve, said control valve having ports connecting the steam line from the main valve to the top of said radiator and having a passage extending through its piston head for connecting the steam line from the main valve to said condensing chamber.

22. In combination with a steam heating system, a steam radiator, a steam supply line, a steam condensing chamber which is adjustable as to size having an atmospheric discharge vent, a main steam pressure operable inlet valve connecting said steam supply line to the base of said radiator and having an opening therethrough connecting said steam supply line to a steam pressure operable control valve, said control valve having ports connecting the steam line from the main valve to the top of said radiator and having an opening therethrough connecting the steam line from the main valve to said condensing chamber.

23. In combination with a steam heating system, a steam radiator, a steam supply line, a telescopically adjustable condensing chamber having an atmospheric discharge vent, a main steam pressure operable inlet valve connecting said steam supply line to the base of said radiator and having an opening therethrough connecting said steam supply line to a steam pressure operable control valve, said control valve having ports connecting the steam line from the main valve to the top of said radiator and having an opening therethrough connecting the steam line from the main valve to said condensing chamber.

24. In combination with a steam heating system, a pressure operable regulating main valve which comprises a tubular sleeve having its lower edge adapted to be mounted within the casing of a conventional globe valve connecting a steam radiator to a steam supply line, said tubular sleeve having ports adjacent its lower edge opening into said radiator, a cap for closing the upper open end of said sleeve having a passage therethrough for receiving a discharge line, a piston slidably mounted in said tubular sleeve having a discharge tube mounted through its head and projecting into said discharge line at all positions of said piston, a pressure operable control valve mounted on the opposite end of said discharge line, said control valve having a casing connecting said discharge line from the main valve to the upper side of the steam radiator, a tubular sleeve having its lower edge adapted to be mounted in the casing of a conventional globe valve and having its opposite end closed, a pipe extending through said closed end and connecting with a condensing chamber having an atmospheric discharge vent, a piston slidably mounted in the tubular sleeve of said control valve having a discharge tube mounted through its head and projecting into said condenser pipe at all positions of said piston.

JOHN W. WEST.